UNITED STATES PATENT OFFICE.

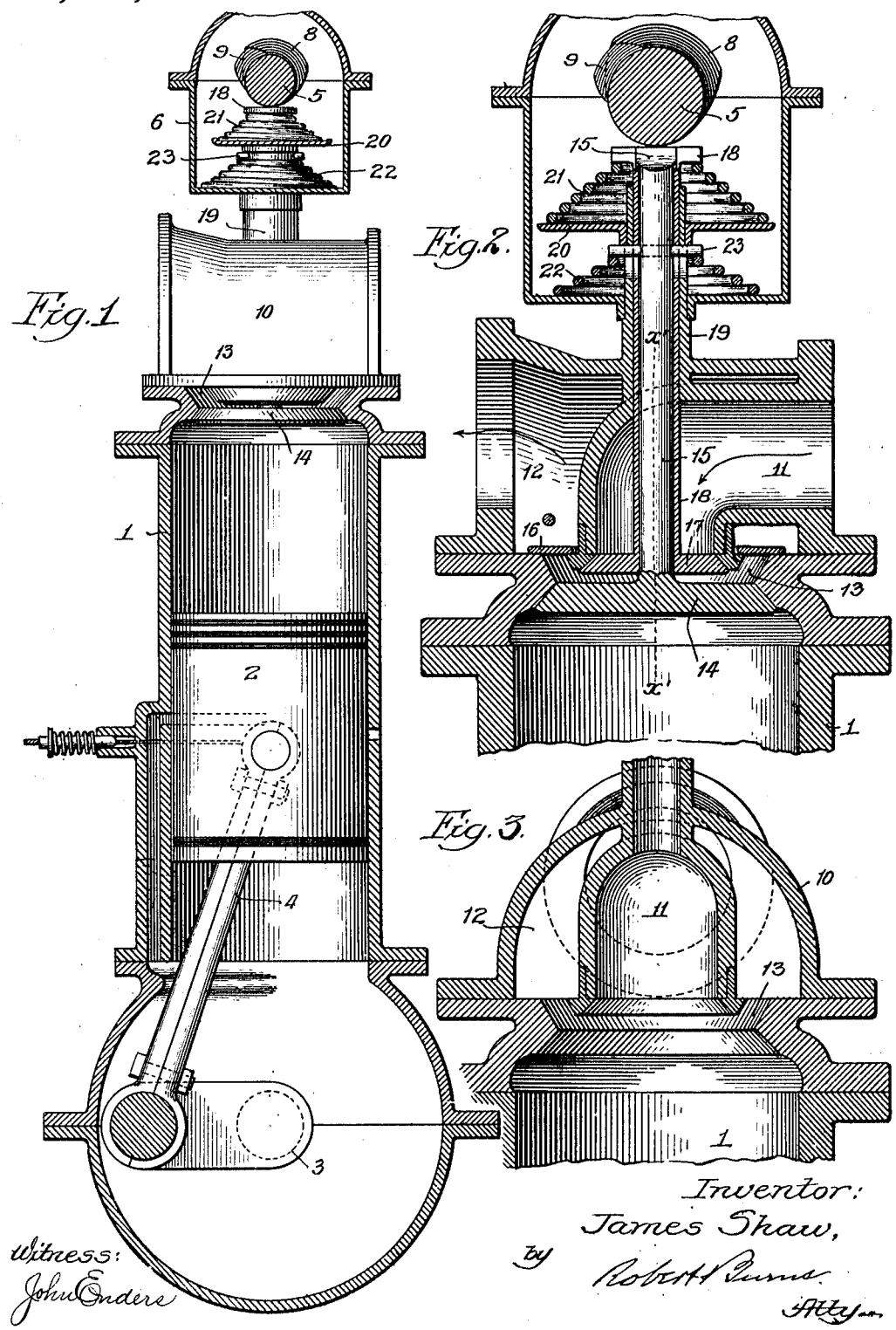

JAMES SHAW, OF CHICAGO, ILLINOIS, ASSIGNOR TO H. S. MOTOR CO., OF CHICAGO, ILLINOIS.

INTERNAL-COMBUSTION ENGINE.

1,314,907.  Specification of Letters Patent.  Patented Sept. 2, 1919.

Application filed April 7, 1917. Serial No. 160,351.

*To all whom it may concern:*

Be it known that I, JAMES SHAW, a citizen of the United States of America, and a resident of Chicago, in the county of Cook, State of Illinois, have invented certain new and useful Improvements in Internal-Combustion Engines, of which the following is a specification.

This invention relates to internal combustion engines of the four cycle type in which a single inlet-outlet opening to the explosion chamber of the engine cylinder is employed, and the present improvement has for its object:

To provide a simple and compact structural formation and association of the valve housing and valves of the engine, by means of which a maximum preheating of the incoming fuel charge is attained, and with which a minimum degree of impedance is offered to the inflowing gaseous fuel charge and the out-flowing charge of combustion products, all as will hereinafter more fully appear.

In the accompanying drawings:—

Figure 1, is a transverse sectional elevation of one of the engine cylinders and its associated parts.

Fig. 2, is an enlarged transverse section of the upper end of an engine cylinder and its valve housing and valves.

Fig. 3, is a detail longitudinal section of the same on line $x'$—$x'$, Fig. 2.

Similar reference numerals indicate like parts in the several views.

Referring to the drawing, 1 designates an engine cylinder provided with the usual piston 2 operatively connected to the engine shaft 3, by a pitman 4, as usual.

5 designates the rotary operating shaft of the engine valves, disposed above the series of engine cylinder 1 in a suitable inclosing housing 6, arranged above said cylinders. Said operating shaft 5 is operatively connected to the engine shaft 3, by any usual intermediate gearing or connection.

8 and 9 designate a series of companion cams fixed on the operating shaft 5, and adapted for operative engagement with the inlet and outlet valves of the engine cylinder, hereinafter described.

10 designates a shell or casing associated with an end head of the cylinder 1, and preferably made separate from said cylinder and attached thereto by marginal flanges on the parts as shown. In the present structure the outer wall of the shell or casing is of a semi-circular shape in cross-section, closed at one end and open at the outer end to provide an outlet from the space inclosed within said outer wall. Within said outer wall is arranged a tubular quarter-bend neck forming the fuel inlet passage 11 to the cylinder 1 and having a horizontally arranged portion integrally connected with an end wall or closure of the aforesaid shell or casing 10, and a vertically depending un-connected portion, the lower annular end of which is formed as a seat for the fuel inlet valve of the engine.

With the above described arrangement the tubular quarter-bend fuel inlet neck lies wholly within the space or chamber inclosed by the outer wall aforesaid, and with said space or chamber in its approximately annular form constituting a part of the exhaust or outlet passage from the engine cylinder 1. The structure while providing a maximum degree of heat transference from the hot exhaust gases to the incoming cold charge of gaseous fuel, at the same time affords a free outlet for the exhaust gases and a like free inlet for the gaseous fuel with a minimum degree of impedance. At their inner and lower ends the chambers 11, 12 have communication with the single inlet-outlet opening of an engine cylinder, now to be described.

13 designates the single inlet-outlet opening or passage of an engine cylinder above referred to, and which is preferably arranged at the upper end of the combustion chamber of said cylinder, and having a diameter sufficient to embrace the circular inner and lower opening of the inlet chamber 11 and the annular lower and inner opening of the exhaust chamber 12. And the said inlet-outlet opening 13 will have controlling valves as follows:—

14 designates a main upwardly closing valve associated with the lower end of the opening 13 and controlling in common the inlet of gaseous fuel and the outlet of the products of combustion from the combustion chamber of an engine cylinder 1, and to such end, the stem 15 of said valve is extended upwardly for operative engagement with an operating cam 8 of the operating shaft 5 aforesaid.

16 designates an annular disk shaped check valve associated with the upper end of the opening 13, and adapted to prevent any retrograde flow of the exhaust back into the combustion chamber in that part of the operation of the engine in which the gaseous fuel supply is drawn into the combustion chamber.

17 designates an upwardly closing valve arranged above the main valve 14 aforesaid, and individual to the inner and lower end of the inlet chamber 11 aforesaid, and controlling the supply of gaseous fuel to the combustion chamber of an engine cylinder 1, and to such end the tubular stem 18 of said valve 17 is extended upwardly for operative engagement with the cam 9 of the operating shaft 5 aforesaid.

Each of the cams 8 of the operating shaft 5 aforesaid, is individual to and adapted for operative engagement with the upper end of a valve stem 15 aforesaid, while each cam 9, preferably comprises counterpart formation at the side of an aforesaid cam 8, and individual to and adapted for operative engagement with the forked upper end of the tubular valve stem 18 aforesaid.

19 designates a hollow stem or standard extending upwardly from a valve casing 10 and adapted to afford a support for the housing 6 of the valve operating shaft 5 aforesaid; a support for the hereinafter described abutment collar of the lifting spring of the fuel inlet valve 17, and a guiding means for the tubular stem 18 of said valve.

20 designates an abutment collar fixed on the stem or standard 19 aforesaid, to provide a support for a spring 21, adapted to exert a yielding upward stress on the tubular stem 18 and hold the fuel inlet valve 17, in its closed condition.

22 designates a companion spring resting upon the bottom web of the housing 6 aforesaid, and exerting a yielding upward stress on the stem 15 of the main valve 14, through a cross pin 23 and elongated slot formation of the parts, and adapted to yieldingly hold said valve 14 in a closed condition.

Having thus fully described my said invention, what I claim as new and desire to secure by Letters Patent, is:—

1. In combination, an engine cylinder having a single inlet-outlet opening, a valve casing associated with said cylinder and opening and comprising an outer inclosing wall and an inner quarter-bend neck arranged wholly within said inclosing wall and having a horizontal portion attached to said wall and a vertical portion wholly disconnected from said wall and formed with a valve seat at its lower end, a main valve head controlling the inlet-outlet opening of the cylinder, a valve head associated with the valve seat of the inner neck aforesaid, means for operating said valve heads, and an annular valve encircling said inner neck and controlling communication between the inlet-outlet opening and the exhaust outlet of the cylinder, substantially as set forth.

2. In combination, an engine cylinder having a single inlet-outlet opening, a valve casing associated with said cylinder and opening and comprising an outer inclosing wall and an inner quarter-bend neck arranged wholly within said inclosing wall and having a horizontal portion attached to said wall and a vertical portion wholly disconnected from said wall and formed with a valve seat at its lower end, a main valve head controlling the inlet-outlet opening of the cylinder, a valve head associated with the valve seat of the inner neck aforesaid, means for operating said valve heads the same comprising associated valve stems, springs for moving said valve heads in one direction and an operating shaft provided with cams for moving said valves in the opposite direction, and a check valve controlling communication between the inlet-outlet opening and the exhaust outlet of the cylinder, substantially as set forth.

Signed at Chicago, Illinois this 5th day of April 1917.

JAMES SHAW.